United States Patent

Tryba et al.

[11] Patent Number: 5,992,218
[45] Date of Patent: Nov. 30, 1999

[54] WATER LEAKAGE PROTECTOR APPARATUS

[76] Inventors: Stephen A. Tryba, 201 Joan Ter., Trenton, N.J. 08629; Mark Slafkovsky, 848 Yardville, Yardville, N.J. 08620

[21] Appl. No.: 08/917,405

[22] Filed: Aug. 25, 1997

[51] Int. Cl.[6] .................................................. G01M 3/18
[52] U.S. Cl. .......................... 73/40.5 R; 73/40; 340/605; 137/312
[58] Field of Search .................... 73/40.5 R, 40, 73/49.1; 340/604, 605; 200/61.04, 61.05; 138/104, 36, 124, 134, 137, 138, 139, 140, 149; 174/47

[56] References Cited

U.S. PATENT DOCUMENTS

| | | | |
|---|---|---|---|
| 2,759,175 | 8/1956 | Spalding | 138/104 |
| 3,770,002 | 11/1973 | Brown | 137/312 |
| 3,874,403 | 4/1975 | Fischer | 200/61.04 X |
| 4,374,379 | 2/1983 | Dennison, Jr. | 340/604 |
| 4,418,712 | 12/1983 | Braley | 200/61.04 |
| 4,446,892 | 5/1984 | Maxwell | 138/104 |
| 4,930,549 | 6/1990 | Renner | 138/104 X |
| 5,267,670 | 12/1993 | Foster | 138/104 X |
| 5,713,387 | 2/1998 | Armenia et al. | 73/46 |

*Primary Examiner*—Michael Brock
*Attorney, Agent, or Firm*—Martin Sachs, Esq.; Samuel Louis Sachs, Esq.

[57] ABSTRACT

A water leakage protector apparatus for appliances subject to leakage includes a first device for detecting water leakage from the water supply line coupled to the appliance and a second device for detecting water leaking from the appliance itself. A control apparatus is coupled to a valve, affixed to the water supply line, is connected to a source of electrical power, and controls the water flowing to the appliance. The appliance is connected to the control apparatus to obtain electrical power for operation. The first and second sensing devices are coupled to the control apparatus so that when a water leak is detected by either the first or the second detecting device the control apparatus stops the water from flowing in the water supply line and interrupts electrical power to the appliance.

9 Claims, 3 Drawing Sheets

FIG. I

WATER LEAKAGE PROTECTOR APPARATUS

BACKGROUND OF THE INVENTION

1. Field of the Invention

The present invention relates to water leakage detection devices and more particularly, to a leakage protector apparatus, which is capable of sensing and containing leakage in the water supply line, as well as, leakage occurring from the appliance to which it is connected.

2. Discussion of the Relevant Art

The prior art abounds with water leakage detecting devices that provide alarms when a leakage is detected. Typical of these devices are those disclosed in U.S. Pat. No. 3,200,388 issued to M. R. Uhlig on Aug. 10, 1965 and U.S. Pat. No. 3,874,403 issued to Fischer on Apr. 1, 1975. Both of these devices have a sensing device disposed beneath the appliance, wherein liquid leaking from the apparatus provides a means to turn off the incoming water supply line and provide an audible alarm. However, these devices make no provision for sensing or protecting the premises from a leak occurring between the plumbing system water supply and the flexible water supply line to the appliance. If the appliance was not operating and a leak developed in the flexible water supply line to the appliance, there would be no way to shut off the input water to the appliance and protect the premises from water damage.

Therefore, it is a primary object of the present invention to provide a protection apparatus that is capable of protecting the premises from a leak occurring in a water supply line to the appliance at all times.

Another object of the present invention is to provide a water leakage detecting apparatus capable of sensing leakage from an appliance, when it is operating and turning off the water supply and the electrical power to the appliance.

It is yet another object of the present invention to provide an inexpensive, reliable detector apparatus, which may be utilized in present installations of appliances that utilize water, such as a clothes or dish washer.

It is still yet another object of the present invention to provide a protection apparatus capable of providing a visual, as well as, an audible signal when a water leak is detected in the input water line or leaking from the appliance and protecting the premises from any additional flow of water.

SUMMARY OF THE INVENTION

A water leakage protector apparatus for appliances subject to leakage, according to the principle of the instant invention, comprises in combination, a first device for detecting water leaking from a water supply line coupled to an appliance and a second device for detecting the water leaking from the appliance. A control apparatus, operates valves affixed to said water supply lines, controls the flow of water flowing in the water supply line. The control apparatus is connected to a source of electrical power and the appliance is coupled to the control apparatus to obtain electrical power to operate. A first and a second coupling device couples the control apparatus to the first and the second detecting device. When a water leak is detected by either the first or the second detecting device, the control apparatus stops the water from flowing in the water supply line and interrupts the electrical power to the appliance.

The foregoing and other objects and advantages will appear from the description to follow. In the description reference is made to the accompanying drawing, which forms a part hereof, and in which is shown by way of illustration, a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENT

Figure 1:
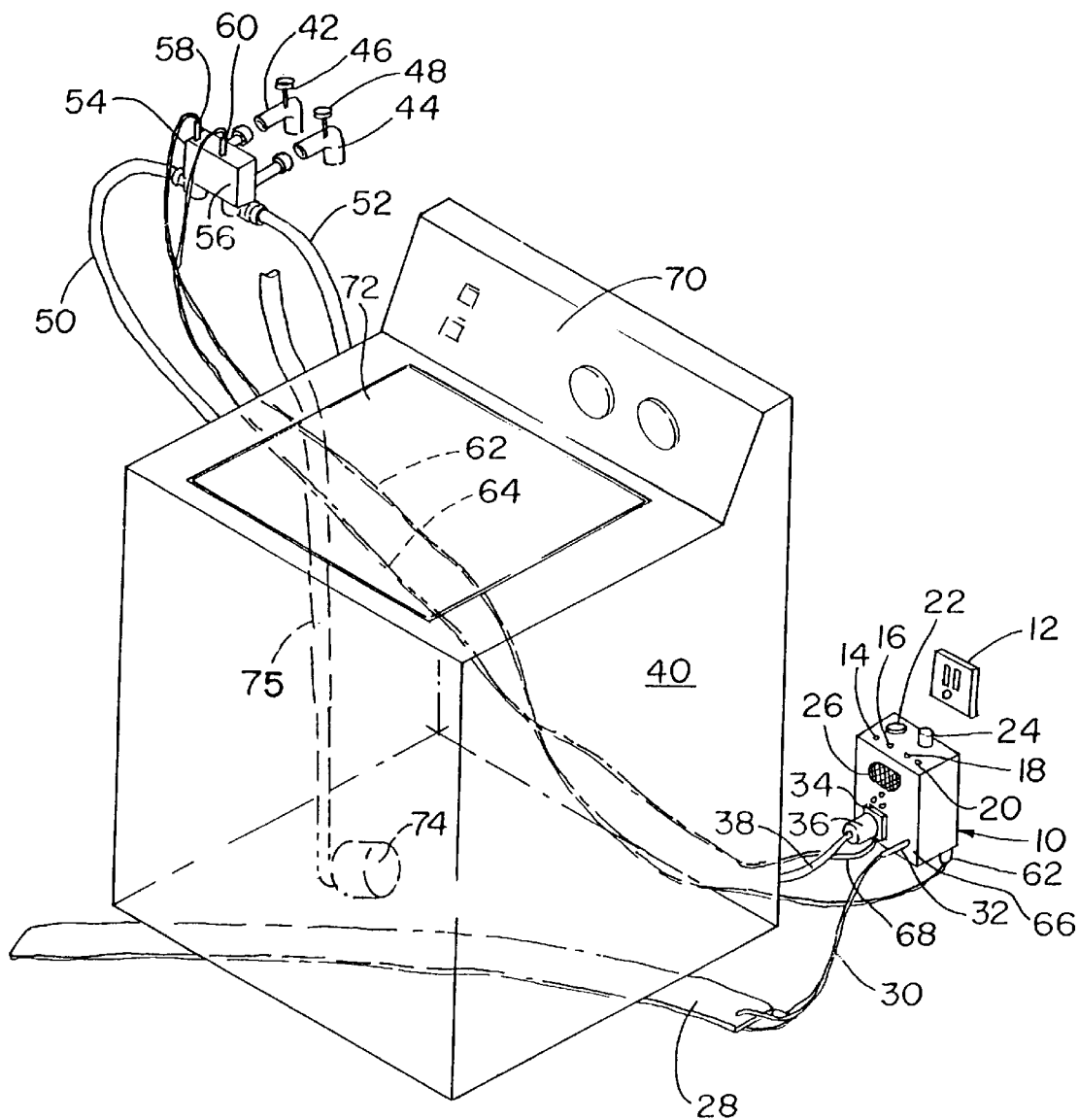
FIG. 1 is a pictorial representation of a typical washing machine and its connections to the control apparatus, according to the principles of the present invention.
Figure 2:
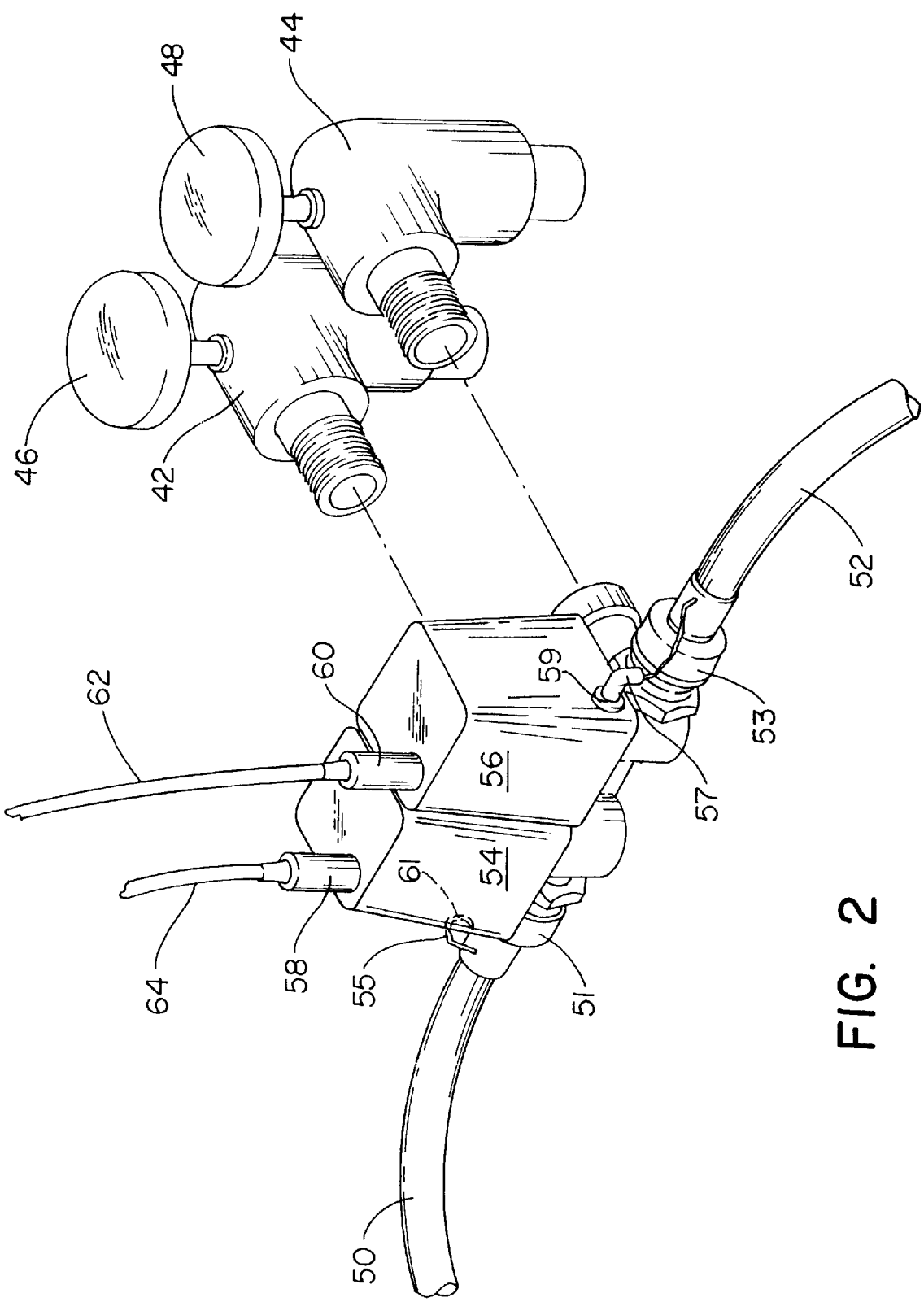
FIG. 2 is a greatly enlarged pictorial representation of the control valves coupled to the plumbing system appliance water source.

Referring to the figures, and in particular to FIG. 1, there is shown a control apparatus 10, which is described in more detail in FIG. 2 . It is seen to include the indicator lights 14, 16, 18 and 20, fuse 22 and reset switch 24. Also included in the control apparatus 10 is an audible alarm or buzzer 26. In addition, the floor liquid sensor 28 is coupled into the control apparatus 10 by a lead wire 30 and a plug 32.

The control apparatus 10 is provided with a line plug 12' which is plugged into conventional wall outlet 12 that supplies 110 volts AC at 60 hertz in order to obtain power for operation. A female output receptacle 34 is provided on the control apparatus 10 and is adapted to receive a male plug 36 therein, which is connected by a power cable 38 to the washing appliance 40. Although the washing appliance 40 is shown as a clothes washer it is to be understood that a dishwasher, etc. may also be used in the same manner and the control apparatus 10 would provide the same type of protection for those appliances also.

The hot and cold water supply lines 42 and 44, which include their own manual OFF/ON valves 46 and 48 manually provide the water into the system and generally are left in the ON or open condition once the installation has been completed. Affixed to the hot and cold water supply lines 50 and 52, which are connected to the appliance (washing machine) 40 is a pair of control valves 54 and 56 that control the hot and cold water flow, respectively, to the water input lines 50 and 52 for the washing machine 40. Also included in the control valves 54 and 56 are output plugs 58 and 60, which are coupled respectively by cable 62 and 64 and plugs 66 and 68, respectively, to the control apparatus 10. Each of the flexible water supply lines 50 and 52 is a three layered hose having an electrically conductive outer layer, an electrically conductive inner layer and a woven insulating central layer disposed therebetween in a sandwiched manner providing a resistance between the inner and outer layer, which changes when the woven insulating central layer has moisture or liquid appearing within the woven central insulating layer. The resistance may vary from a very large value (open circuit) to a very low value (short circuit) or any value therebetween, depending on the conductivity of the liquid appearing within the woven central layer.

The washing machine 40 is provided with a conventional control panel 70, a top opening door 72 and a pump 74 used to discharge the waste water, via an exit hose 75. Should the discharge hose 75 or pump 74 develop a leak, the floor liquid sensor 28 would have a change in resistance between the inner and outer layers similar to that occurring in the input water hose lines 50 or 52. The construction of the floor liquid sensor 28 is identical to that of the hose 50 and 52 except, that it is manufactured as a flat strip.

Referring now to FIG. 2, which is a greatly enlarged pictorial representation of the control valves 54 and 56 coupled to the plumbing system appliance water source 42 and 44. The flexible hoses 50 and 52 are fitted with coupling adapters 51 and 53, respectively that couple them to the control valves 54 and 56, respectively while providing electrical separation between the inner and outer layers of the hoses. A change in resistance between the inner and outer layers of the hoses is coupled to the control apparatus 10, via plugs 55 and 57; and jacks 59 and 61, respectively, via cables 62 and 64.

Figure 3:
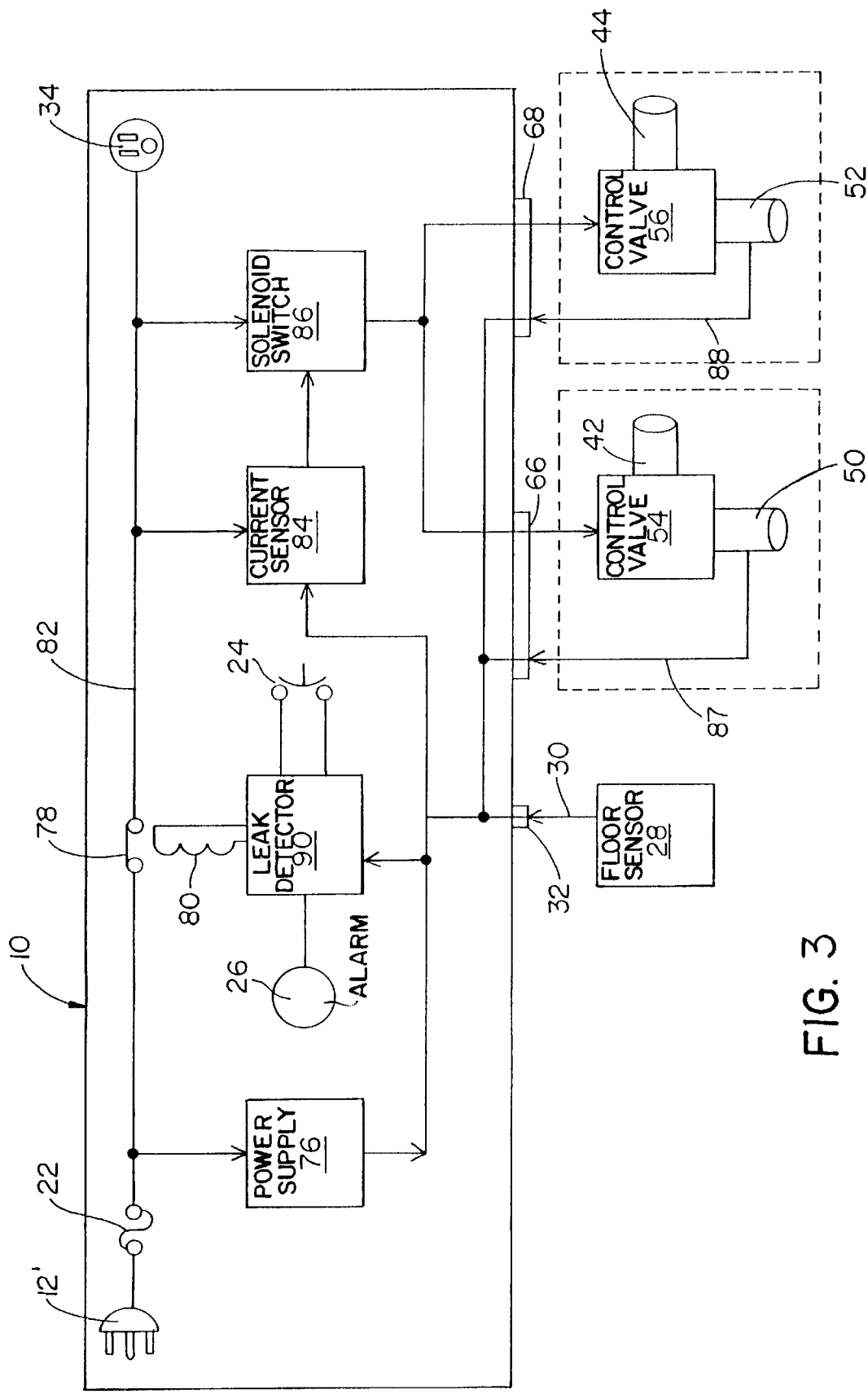
FIG. 3 is a functional block diagram showing the operation of the protector apparatus, as shown in FIG. 1.

Referring now to FIG. 3, which is a functional block diagram describing the operation of the control apparatus 10, as set forth in the instant invention, particularly delineating the important functions. The input power for the operation of the control apparatus 10 is obtained from plug 12' being plugged into the wall receptacle or outlet 12. The input power is provided with a fuse 22 to protect the control circuitry should an unusual amount of current be drawn by the circuit. Directly connected to the input power line is a power supply circuit arrangement 76, which is of conventional design and not disclosed herewith in detail. Connected in series with the fuse 22 and output receptacle 34, into which the washing machine plug 36 is inserted, are the contacts 78 of a power control relay 80 that has its contacts 78, normally in an open position, until the manual reset switch 24 is activated (closed momentarily) which in turn energize relay 80 closing its contacts, thereby allowing power to be connected to the output receptacle 34. When the washing machine 40 is turned on, current flows through the line 82, which is sensed by the current sensor 84, which in turn provides an output voltage to the solenoid switch circuit 86 that, in turn, provides the power to operate control valve 54 and 56 enabling the valves to open allowing the hot water to flow through water line 42 through the valve 54 to the input water line 50 to the washing machine 40 and in a like manner the cold water will flow through water line 44, via valve 56, through the input cold water line 52, which is connected to the washing machine 40.

Should the resistance of the floor sensor 28 or either of the hose sensor resistances appearing across the inner or outer layers of input water lines 50 or 52 have a change in value due to water leakage appearing in the woven insulator central layer, this change would appear on lines 87 and 88 of cables 62 and 64, respectively. This resistance change would be sensed by the leak detecting circuitry 90, wherein the control power relay 80 would be deactivated opening up its contacts 78, thereby removing power from the washing machine, via output receptacle 34. Simultaneously power would be removed from solenoids 54 and 56, so that the solenoids would move to their normally closed position. At the same time the audible alarm system 26 would ring or buzz so that the user of the appliance would be aware of the fact that the machine was turned off because of liquid leakage.

In operation, the control valves 54 and 56 are coupled to the water input lines 42 and 44 and the manual valves 46 and 48 are opened (turned ON). The control apparatus 10 is plugged into the 110 volt 60 hertz power line 12 and the plug 36 of the appliance (washing machine) 40 is plugged into the output receptacle 34. Although it has been shown here that there are two control valves 54 and 56 it is to be understood that a single control valve can be used if the water input lines are put through "Y" connector so that there is only one output water line, if that is all that is required by the appliance to be operated. The operator of the appliance would then operate the appliance in the normal conventional manner and would be aware of a leakage when it occurs by the sounding of the audible alarm, the condition of the illuminated indicating devices or the turn off of the appliance. Once the leakage has been corrected, the reset button 24 would reset the control apparatus 10 into normal operating condition and the appliance could then be operated in its conventional manner.

Preferably, the indicator lights (illuminating devices) 14, 16, 18, and 20 would perform the following functions:

Light 14 illuminated—power is provided to the control apparatus 10;

Light 16 illuminated—power is being drawn by appliance 40 and control valves 54 and 56 open (activated);

Light 18 illuminated—leakage detected, power removed from appliance 40, audible alarm sounds with water flow to the appliance being terminated; and Light 20 illuminated—loss of power to control circuit and appliance, reset required.

Hereinbefore, has been disclosed a control apparatus that provides safe operation of an appliance utilizing water supply lines coupled to it by providing leakage sensing in the input water lines, as well as, any water leakage appearing on the floor beneath the appliance.

It will be understood that various changes in the details, materials, arrangements of parts and operating conditions, which have been herein described and illustrated in order to explain the nature of the invention may be made, by those skilled in the art, within the principles and scope of the instant invention.

Having thus set forth the nature of the invention, what is claimed is:

1. A continuously operable water leakage protector apparatus for appliances subject to leakage, comprising in combination:

A. first electrical sensing means for detecting water leaking from a water supply line coupled to an appliance and second electrical sensing means for detecting said water leaking from said appliance;

B. electrical control valve means, affixed directly to said water supply line, for controlling the flow of said water to said appliance, said control valve means being connected to a source of electrical power and said appliance being coupled to said control valve means to obtain electrical power; and C. first and second means coupling said control valve means to said first and said second electrical sensing means;

wherein, when a water leak is detected by either said first or said second sensing means, said electrical control valve means stops said water from flowing from said water supply line to said appliance.

2. A water leakage protector apparatus for appliances, according to claim 1, wherein said first and said second detecting means comprises:

A. a woven insulating central layer sandwiched between two electrically conductive layers, said two electrically conductive layers having a specific resistance therebetween, said resistance changing with droplets of said water appearing within said woven insulating central layer;

B. an electrically conducting terminal affixed on each said electrically conductive layer; and C. means for indicating said resistance change.

3. A water leakage protector apparatus for appliances, according to claim 1, further including a plurality of devices for indicating the operating condition of said apparatus.

4. A water leakage protector apparatus for appliances, according to claim 3, wherein said indicating devices include a plurality of illuminating means.

5. A water leakage protector apparatus for appliances, according to claim 4, further including an audible device to alert the user of said appliance to a water leak.

6. A water leakage protector apparatus for appliances, according to claim 3, wherein the operating condition of said apparatus is determined by at least four illuminating means and a reset means such that:

a) said first illuminating means being illuminated indicates that electrical power is coupled to said control valve means;

b) said second illuminating means being illuminated indicates that electrical power is being drawn by said appliance;

c) said third illuminating means being illuminated indicates that a leakage has been detected and electrical power is removed from said appliance and that said control valve means has turned off the flow of said water;

d) said fourth illuminating means being illuminated indicates that a there is no electrical power being coupled to the control valve means to turn said water flow on and no electrical power is available to operate said appliance, thereby requiring a system reset; and e) reset means, coupled to said control valve means, for providing said electrical power to said appliance when activated.

7. A water leakage protector apparatus for appliances, according to claim 6, further including an audible device to alert the user of said appliance to a water leak.

8. A water leakage protector apparatus for appliances, according to claim 1, wherein said first means stops water leaking onto the floor from said water supply line coupled to said appliance.

9. A water leakage protector apparatus for appliances, according to claim 1, further including a reset means to prevent said appliance from being turned on after a water leakage is detected unless said reset means is activated.

* * * * *